United States Patent Office 3,086,917
Patented Apr. 23, 1963

3,086,917
METHOD FOR PRODUCING OROTIC ACID BY FERMENTATION PROCESS
Shukuo Kinoshita and Katsunobu Tanaka, Tokyo, and Kazuo Kimura, Sagamihara-shi, Japan, assignors to Kyowa Hakko Kogyo Co., Ltd., Tokyo, Japan, a corporation of Japan
No Drawing. Filed June 14, 1961, Ser. No. 116,943
Claims priority, application Japan June 15, 1960
7 Claims. (Cl. 195—47)

The present invention relates to a method for producing orotic acid by fermentation process. More particularly, it relates to a method wherein a microorganism which requires pyrimidines is cultured in a fermentation medium properly containing a carbon source, a nitrogen source, mineral materials, and other necessary nutrients, whereby orotic acid is directly produced and accumulated in the medium; the orotic acid is separated and recovered.

One object of the invention is to provide a method for producing orotic acid at moderate cost. Other objects will be apparent from the description which follows.

Orotic acid is a precursor of pyrimidine materials which are components of nucleic acid, and is regarded to be vitamin $B_{13}$, which is important for metabolism of nucleic acid, multiplication of cells in living body, heredity, protein synthesis, and metabolism of saccharide and lipid. It has been found from clinical research on orotic acid that it is remarkably effective in the treatment of liver disease, and that it has a blood-making effect as well as a growth-promoting effect. Thus, orotic acid is becoming of increasing importance Herefore, there have been a large number of reports of research on nucleic acid metabolism using microorganisms from the standpoint of enzymatic chemistry and heredity, and it has been known that mutant strains of *Neurospora crassa*, which require pyrimidines, accumulate a slight amount of orotic acid in the culture medium. (See Journal of Biological Chemistry 172, 525, [1948].) However, commercial production of orotic acid by fermentation has never been known.

The present inventors have fully investigated microorganisms which can directly produce orotic acid in a higher yield in a culture liquor using a cheap carbon source, such as saccharine materials, organic acids, and the like, and an inorganic nitrogen source, as main raw materials. Consequently, we have discovered that pyrimidine-requiring mutant strains of organisms having the ability to produce and accumulate amino acids in a medium containing saccharine materials and inorganic nitrogenous compounds, as main raw materials, have an ability to produce and accumulate orotic acid. By cultivation of these microorganisms under suitable culturing conditions, almost orotic acid alone is accumulated in a remarkably large amount, with little by-product, such as amino acid, organic acids, and the like. The amount of orotic acid produced is so large that it exceeds by far the solubility of orotic acid, its ammonium salt or other salts, in the fermented medium. Thus, a major part of the orotic acid or its salt isolates in the crystalline form in the culture medium during the fermentation, and the orotic acid produced can be separated and recovered in a simple manner after the termination of the cultivation.

The phenomenon that such a remarkably large amount of orotic acid is produced in a crystalline form in the culture medium has never been recognized. Thus, an advantageous novel method for commercially producing orotic acid has now been invented.

The inventors select *Micrococcus glutamicus* No. 534–615–305 strain (on deposit at the American Type Culture Collection under accession number ATCC 14275), which needs uracil for its growth, by a process for causing artificial variation of *Micrococcus glutamicus* No. 534 strain.

Bacteriological characteristics of *Micrococcus glutamicus* have been described in Japanese Patent No. 243,382 and the Bulletin of the Agricultural Chemical Society of Japan, 22, No. 3, pages 176 to 185. The No. 534–615–305 strain was obtained by applying ultra-violet irradiation to the original strain, and differs from the latter in needing uracil for growth.

The inventors have recognized that, in a large number of bacteria belonging to *Micrococcus glutamicus*, mutants which require pyrimidines, such as uracil, cytidine, uridine, and the like, have the ability to produce a remarkably large amount of orotic acid.

Any organic or synthetic culture medium may be employed as the culture medium composition to be utilized in the present fermentation process as long as it properly contains a carbon source, a nitrogen source, mineral materials, and other nutrients, as shown in the following examples.

As the carbon source, various carbohydrate materials, such as glucose, fructose, mannose, galactose, sucrose, maltose, glycerol, mannitol, starch hydrolysate, molasses, and the like, may be used. Also, organic acids, such as gluconic, acetic, lactic, pyruvic, citric, aconitic, $\alpha$-ketoglutaric, fumaric, malic, oxaloacetic, and other acids, may be employed alone or in combination with the carbohydrate material.

As the nitrogen source, ammonia; various inorganic and organic ammonium salts, such as ammonium sulfate, chloride, nitrate, phosphate, carbonate, acetate, and the like; various nitrates; urea, and other nitrogenous compounds, as well as peptone, NZ-amine, meat extract, yeast extract, corn steep liquor; amino acids, such as glutamic, aspartic, and other acids; and hydrolysates of protein materials, such as casein, fish meal, soy bean cake, chrysalis, fermentation residue, and others, may be used. When a pure synthetic culture medium is used, addition of a proper amount of biotin and uracil, required for growth of the bacteria, permits accumulation of orotic acid in the same or greater degree as compared with that when using natural organic nutrient source as mentioned above.

As the mineral materials, dipotassium phosphate, monopotassium phosphate, magnesium sulfate, iron sulfate, manganese sulfate, calcium carbonate, and the like, may be used.

The fermentation is preferably carried out under an aerobic condition such as, by cultivation under shaking, cultivation under agitation and aeration, and the like. The cultivation temperature may be from 24° to 37° C., preferably from 28° to 33° C. The pH tends to decrease to below 7.0 during the cultivation, but the pH may preferably be adjusted within 5.5 and 8.5 by use of an adequate neutralizing agent at the commencement of, or during, the cultivation, if a higher yield is to obtain. As the neutralizing agent, aqueous ammonia; a caustic alkali such as sodium hydroxide, potassium hydroxide and the like; ammonium carbonate; calcium carbonate; calcium hydroxide, and the like, may be employed. Addition of urea serves as a supply of ammonia and for the adjustment of pH, which is effective for production of orotic acid. A remarkably large amount of orotic acid accumulates in the culture medium within the cultivation period of 2 to 3 days.

The present invention will more fully be understood from the following examples.

*Example 1*

In each of a plurality of 250 ml.-volume Erlenmeyer flasks, 20 ml. of a fermentation medium is placed, and sterilized prior to use. The medium contains 5.0% of glucose, 1.5% of ammonium acetate, 0.05% of monopotassium phosphate, 0.05% of dipotassium phosphate, 0.5% of urea, 0.5% of yeast extract, 0.05% of magnesium sulfate, 0.001% of manganese sulfate, 0.5% of ammonium sulfate, and 10γ/liter of biotin.

Mutants of bacteria listed below, which require a pyrimidine, are inoculated to each of the media, and cultured at 30° C. under shaking. Seventy-two hours later, the amounts of orotic acid produced are estimated, as follows:

| Name of bacteria: | Amount of orotic acid produced (g./100 ml.) |
|---|---|
| *Micrococcus glutamicus* No. 534-615-305 (ATCC 14275) | 0.52 |
| *Micrococcus glutamicus* No. 588-208 (ATCC 14276) | 0.41 |

Example 2

The strain employed in the example is *Micrococcus glutamicus* No. 534-615-305. A five hundred ml. portion of culture medium is placed in each of a plurality of 2000 ml.-volume Erlenmeyer flasks, and sterilized prior to use.

The fermentation medium has the following composition; glucose, 5.0%; $KH_2PO_4$, 0.05%; $K_2HPO_4$, 0.05%; $MgSO_4 \cdot 7H_2O$, 0.05%; $MnSO_4 \cdot 4H_2O$, 0.001%; $FeSO_4 \cdot 7H_2O$, 0.001%; $(NH_4)_2SO_4$, 0.5%; urea, 0.5%; biotin, 25γ/liter (pH 7.0).

After the inoculation of said strain, the inoculated medium is cultured under shaking while keeping the temperature at 30° C. During the cultivation, urea is added to supply the ammonia source and to adjust the pH of the fermentation liquor within a range from 6.0 and 8.0. In the course of the cultivation, crystals of ammonium orotate isolate in the medium. After 72 hours cultivation, a fermented liquor containing 0.8% of orotic acid is obtained.

Example 3

The process described in Example 2 is repeated using a culture medium containing 10.0% of glucose, 0.05% of $KH_2PO_4$, 0.05% of $K_2HPO_4$, 0.05% of $MgSO_4 \cdot 7H_2O$, 0.001% of $MnSO_4 \cdot 4H_2O$, 0.001% of $FeSO_4 \cdot 7H_2O$, 0.5% of $(NH_4)_2SO_4$, 0.5% of urea, 20γ/liter of biotin, and 100γ/ml. of uracil. The cultivation is continued for 72 hours. The amount of orotic acid produced is 10 mg./ml. The crystals which crystallize during the cultivation are isolated, and the filtered fermentation liquor is concentrated. The crystals formed upon cooling of the concentrate are filtered. Thus, ammonium orotate, corresponding to 9.2 g. of orotic acid, is obtained from 1 liter of the fermented liquor (containing 10 g. of orotic acid). The salt of orotic acid is easily changed to the free acid by heating with a dilute hydrochloric acid.

We claim:

1. A method of producing orotic acid by fermentation which comprises cultivating a pyrimidine-requiring *Micrococcus glutamicus* mutant in an approximately neutral medium containing carbon source, nitrogen source, mineral material and biotin, and recovering from the medium orotic acid produced.

2. A method of producing orotic acid by fermentation which comprises cultivating *Micrococcus glutamicus* No. 534-615-305 in an approximately neutral medium containing carbon source, nitrogen source, mineral material and biotin, and recovering from the medium orotic acid produced.

3. A method of producing orotic acid by fermentation which comprises cultivating *Micrococcus glutamicus* No. 534-615-305 in an approximately neutral medium containing carbon source, nitrogen source, mineral material, uracil and biotin, and recovering from the medium orotic acid produced.

4. A method of producing orotic acid by fermentation which comprises cultivating *Micrococcus glutamicus* No. 534-615-305 in an approximately neutral medium containing carbon source, nitrogen source, mineral material, nucleic acid and biotin, and recovering from the medium orotic acid produced.

5. A method of producing orotic acid by fermentation which comprises cultivating *Micrococcus glutamicus* No. 534-615-305 in an approximately neutral medium containing carbon source, nitrogen source, mineral material and biotin, maintaining the pH of the medium by adding thereto at least one member selected from the group consisting of aqueous ammonia, ammonia gas, sodium hydroxide, potassium hydroxide, ammonium carbonate, calcium carbonate, calcium hydroxide and urea, and recovering from the medium orotic acid produced.

6. A method of producing orotic acid by fermentation which comprises cultivating *Micrococcus glutamicus* No. 534-615-305 in an approximately neutral medium containing carbon source, nitrogen source, mineral material and biotin, maintaining the pH of the medium within the range from 5.5 to 8.5, and recovering from the medium orotic acid produced.

7. A method of producing orotic acid by fermentation which comprises cultivating *Micrococcus glutamicus* No. 588-208 in an approximately neutral medium containing carbon source, nitrogen source, mineral material and biotin, and recovering from the medium orotic acid produced.

References Cited in the file of this patent

Chemical Abstracts, vol. 49, column 1869*b* (1955).
Bergey's Manual of Determinative Bacteriology, 7th ed., page 342 (1957).